United States Patent [19]
Rodloff et al.

[11] Patent Number: 5,408,751
[45] Date of Patent: Apr. 25, 1995

[54] HIGH RESOLUTION GYRO SYSTEM FOR PRECISE ANGULAR MEASUREMENT

[75] Inventors: K. Rudiger Rodloff, Meinersen; Bernhard F. M. Stieler, Braunschweig; H. B. Egmar Lubeck, Braunschweig; Volker Wetzig, Braunschweig; Reinhard H. F. Probst, Braunschweig, all of Germany

[73] Assignee: Deutsche Forschungsanstalt fur Luft- und Raumfahrt e.V., Cologne, Germany

[21] Appl. No.: 126,086

[22] Filed: Sep. 23, 1993

[30] Foreign Application Priority Data

Sep. 24, 1992 [DE] Germany .................. 42 31 935.8

[51] Int. Cl.⁶ .................................. G01C 19/00
[52] U.S. Cl. .............................. 33/318; 33/316
[58] Field of Search ............ 33/313, 316, 318, 327, 33/324, 325, 326, 328, 329, 534, 1 N

[56] References Cited

U.S. PATENT DOCUMENTS

| | | |
|---|---|---|
| 3,535,940 | 10/1970 | Allen . |
| 3,582,213 | 6/1971 | Catherin . |
| 3,746,843 | 7/1973 | Wesner ................. 33/325 |
| 3,806,913 | 4/1974 | Kerhoas et al. ........... 33/318 |
| 3,917,928 | 11/1975 | Wesner ................. 33/325 |
| 4,017,187 | 4/1977 | Schwartz . |
| 4,071,959 | 2/1978 | Russell et al. .......... 33/318 |
| 4,179,087 | 12/1979 | Johnson ............... 33/326 |
| 4,336,596 | 6/1982 | Martin ................. 33/326 |
| 4,622,646 | 11/1986 | Waller ................. 33/326 |

FOREIGN PATENT DOCUMENTS

| | | |
|---|---|---|
| 3820906 | 12/1989 | Germany . |
| 1181550 | 12/1967 | United Kingdom . |
| 8806712 | 9/1988 | WIPO . |

OTHER PUBLICATIONS

*IEE Journal of Quantum Electronics*, vol. QE-23, No. 4, Apr. 87 "A Laser Gyro with Optimized Resonator Geometry" written by R. Rodloff.

German Periodical Technisches Messen tm, 55. Jahrgang, Heft Oct. 1988, pp. 389-396 "Angular measurements with laser gyro", D. Ullrich et al.

German periodical DLR-Nachrichten, 61 Nov. 1990 "Wo liegen die Grenzen des Laserkreisels?" by R. Rodloff.

Buch "Industrielle Winkelmesstechnik" by Prof. Dr.--Ing. Wolfgang Beyer et al., published 1990 by expert verlag, 7044 Ehningen bei Boblingen, Germany-cover sheet and pp. 118 to 121.

*Primary Examiner*—William A. Cuchlinski, Jr.
*Assistant Examiner*—G. Bradley Bennett
*Attorney, Agent, or Firm*—Salter & Michaelson

[57] ABSTRACT

The system includes for planar angular measurements a gyro—preferably a laser gyro—and an angle encoder mounted with their sensitive axes coaxially on a turntable shaft, which is rotatably mounted in a case and driven at constant speed with respect to said case. The angular rate should be high enough to operate the laser gyro above the lock-in rate. For spatial angular measurements and navigation three gyros are mounted with their sensitive axes spatially arranged with respect to the turntable shaft to sense the same component of its angular rate. For avaraging errors due to gyro scalefactor and drift, the turntable is mounted on a second shaft with is axis perpendicular to the turntable. The second shaft is provided with a second an coder and a motor rotating the second shaft. The processing of the signal readout of the gyro(s) and encoder(s) allows to increase the accuracy, resolution and bandwidth of angular measurements with respect to a locally fixed basis or to inertial space.

13 Claims, 5 Drawing Sheets

HIGH RESOLUTION GYRO SYSTEM FOR PRECISE ANGULAR MEASUREMENT

BACKGROUND OF THE INVENTION

The invention relates to a system including at least one gyro for precise angular measurements.

In a known gyro system of that kind based on a lasergyro, the lasergyro is operated within a case through constant rotation above the lock-in rate—known as rate-bias gyro. In order to obtain information on the rotation angle of the gyro with respect to its casing, the system passes after each full rotation a photo-electric null indicator permitting to determine the 360° angle with a precision within the order of magnitude of one arc second (1"), approximately. By means of a 360° pulse a counter is controlled which counts the output pulses (interference patterns). If the case is kept earth-fixed, the number of gyro pulses per 360° or the angle of rotation per lasergyro output pulse, i.e. the scalefactor, is obtained after deduction of the pulses due to the earth rate (DLR-Nachrichten 61, November 1990, pages 12 to 15).

Gyros present the advantage that they allow angular measurements without a locally fixed basis. As far as the angular resolution is concerned, conventional laser gyros are limited, to a value between 1.5-3". This value can at best be improved by factors 2 or 4 even if the conventional signal readout is expanded. Many applications require however resolutions by one to two orders of magnitude higher.

For precision angular measurements, turntables with an in-built digital measurement system are known. They contain an encoder with angular divisions in the form of a line grid which is read out photoelectrically. In commercial measurement systems divisions of up to 36,000 lines on the circle perimeter are realized corresponding to an angular resolution of 0.01°=36". In connection with a 1024-time digital interpolation of the division interval measurement steps down to 0.035" are reached.

In this connection measurement uncertainties are due to division deviations during the manufacturing of the encoder, to adjustment errors during the installation of the encoder on the angular measurement table and to interpolation errors during signal processing.

Measurement uncertainties can be reduced by means of a self-calibrating dynamic angular measurement procedure referring to the full angle of 360° as error-free normal based on the permanent rotation of the encoder. In this procedure the encoder readout furnishes a periodic signal, the phase of which is evaluated as angular measurement through comparison with a phase-fixed reference signal. Through integration (averaging) over the full circle the principle is applied that the sum of all angular segments amounts to 360° and the sum of all deviations of divisions to 0°. In this context it is also known to have two encoder disks with identical line grid divisions mounted on a single shaft and to have them constantly driven by a motor. The readout system of the first of these two encoder disk is fixed to a base plate on which the shaft is rotatably mounted. This readout system produces a phase-fixed reference signal. The readout system of the second encoder disk is fixed to a turntable mounted coaxially with the shaft carrying the disk of the encoder and furnishes a measurement signal with changing phases (Kontakt und Studium, Band 260, "Industrielle Winkelmeβtechnik", Expert Verlag, S. 118-122). With such a system using two encoder disks the measurement uncertainty can be reduced to 0.03". For the phase readout a 64-MHz oscillator is used allowing an angular resolution of 0.04" for the individual measurements. The resolution for the whole system is in the order of 0.01".

SUMMARY OF THE INVENTION

The invention proposes a gyro system useful for angular measurements in space and for navigational purposes by which an angular resolution in the order of 0.01" is attainable.

Object of the invention is a system for angular measurements and/or navigation including a gyro mounted on a shaft turnably mounted in a case and driven at a constant angular rate with respect to said case and being provided with a first readout system issuing readout signals in the form of a first pulse train, an encoder for the measurements of the rotation with respect to said case mounted concentrically on said shaft and cooperating with a second readout system fixed to said case, issuing readout signals in the form of a second pulse train, a circuit including computing means for counting the pulses of the first pulse train, a time basis providing time pulses at a constant frequency higher than the maximum pulse frequency of the pulses in said first pulse chain, means for counting the pulses provided by said time basis, switching means for reading in the levels of said counting means in said computing means, means for controlling said switching means, the computating means being programmed for computing the angular position from the levels of said counting means.

As angular measurements by means of the gyro system developed in the invention need no locally fixed basis for the determination of the angle, it permits to implement angular measurements in cases where other procedures fail. As an example there should be mentioned modern robots or large-scale telescopes in lightweight construction. In the case of robots the position of the gripper is of interest. A determination of its position by means of angular measurements in the joints of the robot arms is often impossible, since the arms bend as a result of the load. As to modern lightweight telescopes, the lack of heavy structures makes it impossible to read out the angles at their gimbal axes. In such cases angular positions and variations can be determined with high precision in accordance with the gyro system of the invention.

With the increase in angular resolution and bandwidth of the measurement a gyro system is created also for other cases of application. Another advantage lies in the fact that a calibration via the full 360° circle under stationary conditions becomes possible.

DESCRIPTION OF THE PREFERRED EMBODIMENTS

Figure 1:
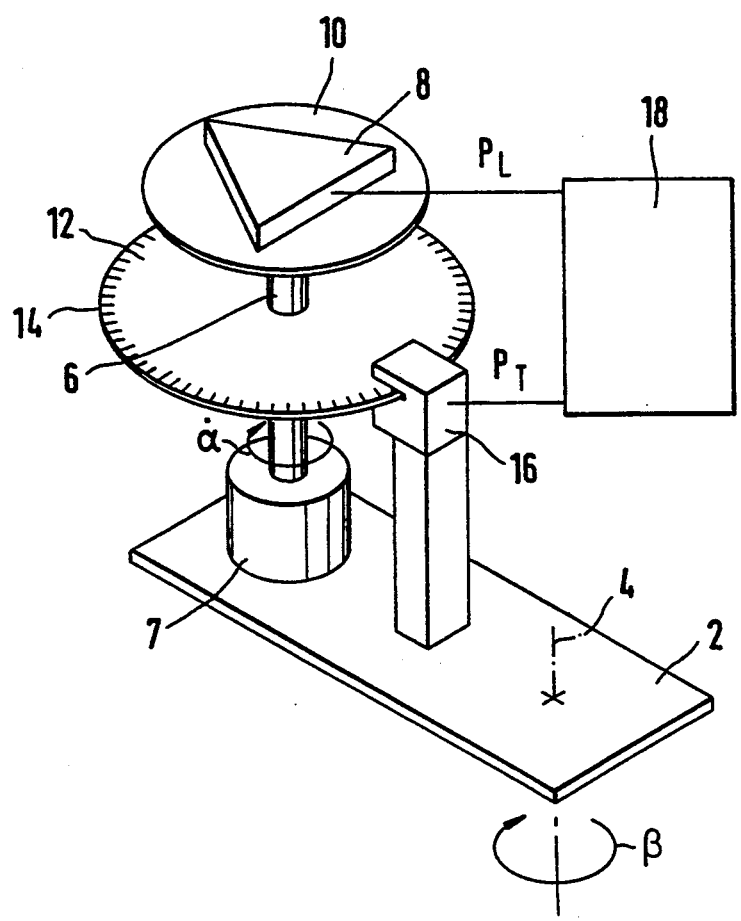
FIG. 1 shows a diagram of an example of a gyro system in accordance with the invention.

The gyro system shown in FIG. 1 is to be arranged in a case which is represented here by a basic plate 2. The basic plate 2 is turnable around an axis 4. The angle $\beta$ is the angle of rotation with respect to inertial space.

On the basic plate 2 a shaft 6 is mounted which is continuously rotatable at a constant speed with respect to plate 2 by a motor 7. On the shaft 6 a gyro 8, preferably a lasergyro, is mounted, for example, by means of a disk 10 fixed to the shaft 6. Gyros are insensitive to decentral mounting. Therefore it is not necessary to have a fine axial adjustment for the gyro 8 on the disk 10 relative to the axis of the shaft 6.

On shaft 6 is further mounted an encoder disk 12, which is provided with an incremental angular division in the form of a line grid 14. The division can, for instance, be 36,000 lines on the perimeter, a division which is often used on decoders for angular measurements.

Cooperating with the encoder disk 14 a readout element 16 is provided which is fixed to plate 2 and furnishes an output signal $p_T$. For the lasergyro 8 a conventional readout system is provided which is not shown in detail here. It supplies an output signal $p_L$. The signals $p_T$ and $p_L$ are pulse trains. These signals are fed into a circuitry for the angular measurement which is shown in FIG. 1 as a block 18. In the circuitry means for counting the pulses of both pulse trains $p_T$ and $p_L$ are provided for the coarse measurement of the angles. For the fine measurement the circuitry provides means for the interpolation of the pulse increment fractions between the pulses of the two pulse trains by using pulses of a higher frequency time base.

The signal frequency of the laser gyro is:

$$\nu = (4F/L\lambda)\Omega \qquad (1)$$

F: Area enclosed by laser beams; L: Circumference of the resonator; $\lambda$: Light wave length; $\Omega$: Angular rate with respect to inertial space.

The rotation angle $\gamma$ is obtained from $\gamma = \int \Omega dt$ by counting the interference lines at the ring laser's output. For the number n of the interference lines passing the detector it can be said:

$$n = (4F/L\lambda)\gamma = K\gamma. \qquad (2)$$

The scalefactor K is equal to the number of interference lines divided by the corresponding angle, in analogy to the optical encoder it is equal to the number of division increments per 360°. The reciprocal value 1/K can thus be interpreted as angular increment $\Delta\phi_L$. If it is assumed that the area F enclosed by the laser resonator is equal in size with a circular area of the radius R ($F = \pi R^2$) and if the circumference L of the resonator is replaced by the corresponding circular circumference ($L = 2\pi R$), the above equation can be transcribed to:

$$n = (2R/\lambda)\gamma. \qquad (3)$$

For a full rotation, i.e. $\gamma = 2\pi$ this leads to the number of interference lines:

$$N = (4\pi R/\lambda) = 2L/\lambda \qquad (4)$$

or $$N = 2m, \qquad (5)$$

respectively, where $m = L/\lambda$ is the number of wave lengths fitting into a ring resonator of the length L (m: ordinal number of the resonator; typical: $m = 10^6$). The factor '2' in the equation above is valid for a circular resonator only; for a quadrangular resonator the factor is 1.51 and for a triangular 1.31. The laser gyro 8 can thus be understood as a disk with the division interval $\lambda/2R$.

In the encoder system with the division line grid 14 marked on the disk 12 angular measurements are made with respect to the readout element 16. In contrast the lasergyro 8 measures the angles with respect to the absolute reference system. Thus the laser gyro reads out the angle $\lambda$ with respect to inertial space, while the readout system 16 of the encoder 14 reads out the rotation angle $\alpha$ of the shaft 6 driven by the motor 7 relative to the case. The difference of the angular measurement signals $p_L$ and $p_T$ yields the inertial rotation angle $\beta$ of the case 2 sought after.

$$\beta = \lambda - \alpha. \qquad (6)$$

Figure 2:
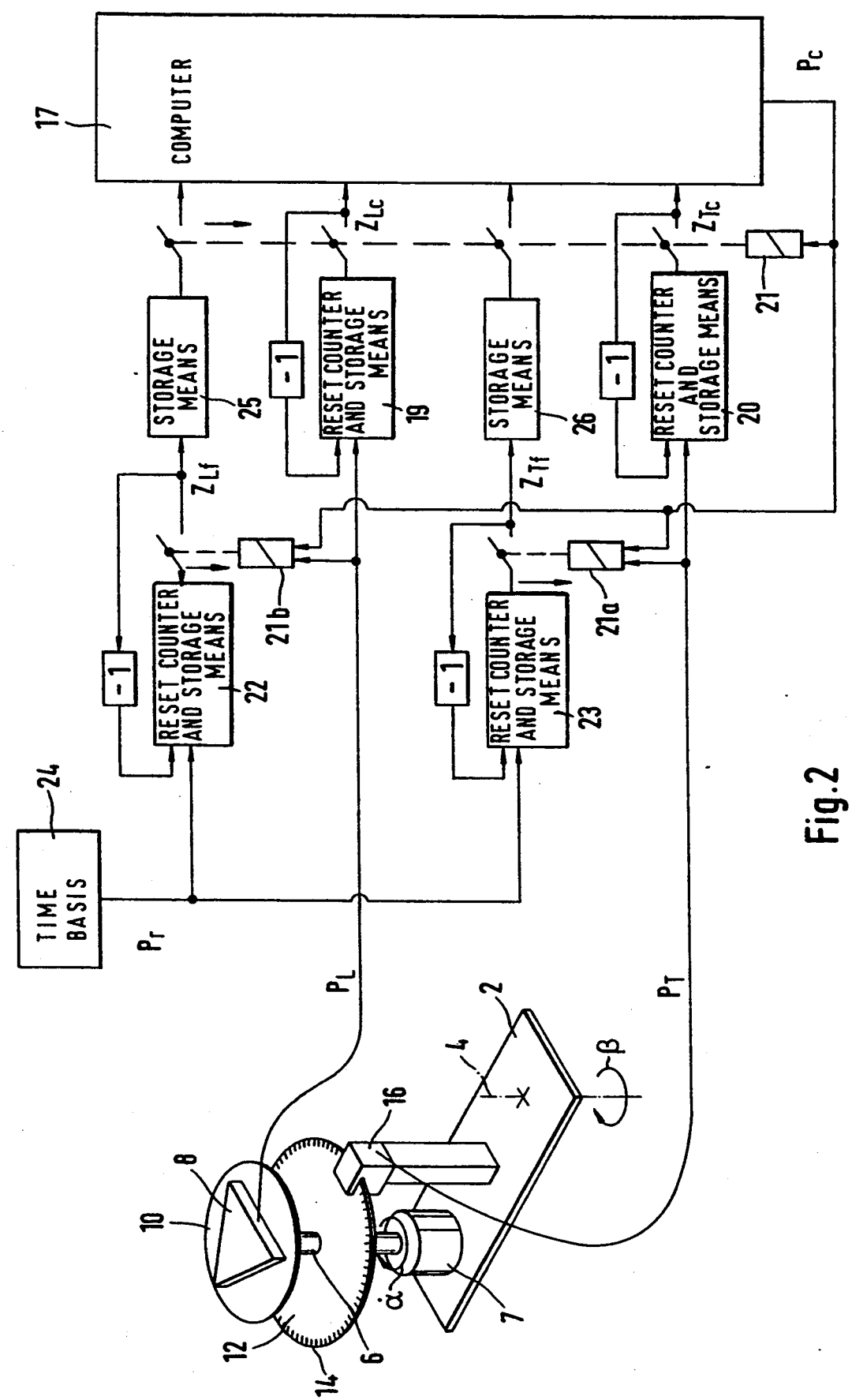
FIG. 2 shows a gyro system according to FIG. 1 together with a first embodiment of the circuitry for a readout of the gyro systems.

FIG. 2 represents an example of the circuitry for signal processing of the output signal $p_T$ of the encoder and the output signal $p_L$ of the gyro by means of computer-controlled sampling.

After the measurement of an angular increment $\Delta\phi_L$ the laser gyro supplies a pulse $p_L$ and the readout system 16 of the encoder 14 a pulse $p_T$ when passing the encoder line mark. Both pulse trains $p_L$ and $p_T$ are summed up in reset counters 19-$Z_{Lc}$ and 20-$Z_{Tc}$. A computer 17 reads out the counter levels $z_{Lc}$ and $z_{Tc}$ with a fixed sampling frequency and resets the counters to null, which is symbolized in FIG. 2 by the pulse $p_c$ feeding a switching relay 21. The index c=coarse of both counters 19, 20 and their readings $z_{Lc}$ and $z_{Tc}$ indicate that they store only coarse information on the angles $\lambda$ and $\alpha$. Fine information (index f=fine) is supplied by counters 22-$Z_{Lf}$ and 23-$Z_{Tf}$ which sum up the pulses $p_r$ of a time reference 24. The readout and resetting of their levels $Z_{Lf}$ and $Z_{Tf}$ are controlled by the pulses $p_L$ and $p_T$ as well as alternatively by the computer pulse $p_c$. Both counter levels $z_{Lf}$ and $z_{Tf}$ go into a storage memory 25-$S_L$ and 26-$S_T$ respectively, for intermediate storage of the preceding counter levels $z_{Ll}$ and $z_{Tl}$ and the actual counter levels $z_{La}$ and $z_{Ta}$. The sampling pulse $p_c$ of the computer 17 which also controls the switching relay 21a and 21b, causes the transfer of this information into the computer 17.

Figure 3:
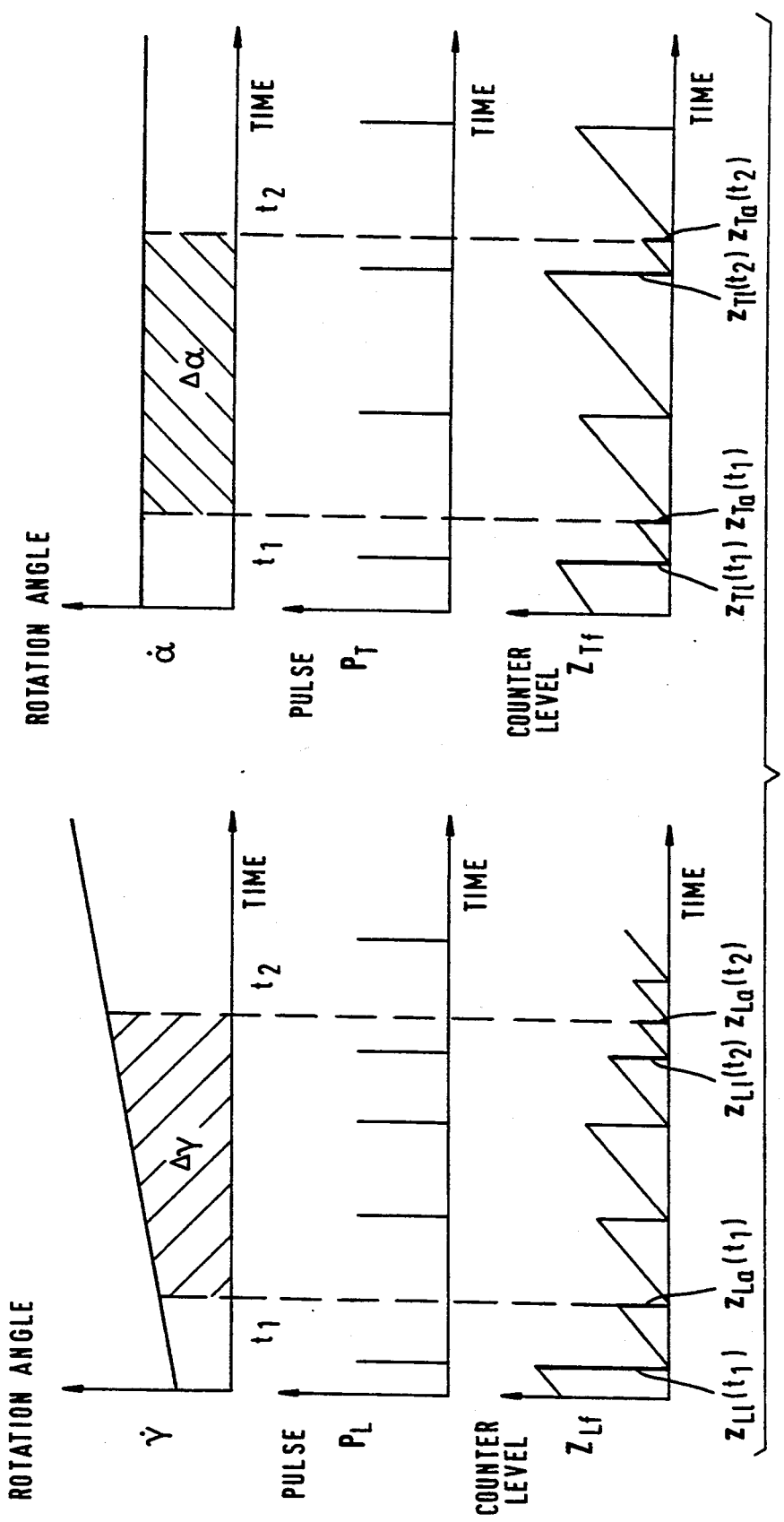
FIG. 3 shows timing diagrams of the readout of the gyro system.

By means of FIG. 3 signal processing for angular measurement between points of time $t_1$ and $t_2$ is now explained. On the left half the timing diagram for the lasergyro measurement signal and on the right half that for the encoder 4 with readout system 10 is outlined. In principle, they are both identical, and the discussion is restricted to the left half.

The upper diagram shows the assumed course of the input angular rate $\lambda$ measured by the laser gyro which, in general, differs from the input angular rate $\dot\alpha$ measured on the encoder disk 12. In accordance with the above described physics the gyro furnishes a pulse $p_L$ each time after passage of the angular increment $\Delta\phi_L^*$ (* indicating that the measurement contains errors). The pulse train is summed up by the counter $Z_{Lc}$ in accordance with FIG. 2. At the points of time $t_1$ and $t_2$ a signal readout is carried out by the computer 17 by means of pulse $p_c$. According to the example of FIG. 3, left, diagram in the middle, the counter level is $z_{Lc}=3$ at the point of time $t_2$. The following lower diagram indicates the counter level $z_{Lf}$ for fine readout. As the computer is not synchronized to the pulses $p_L$, the angular readout is computed on the basis of the actual and the preceding counter levels $z_{La}(t_2)$ and $z_{Lf}(t_2)$ at the actual sampling point of time $t_2$, as well as $z_{La}(t_1)$ and $z_{Lf}(t_1)$ at the preceding sampling point of time $t_1$. As the counter level is $z_{Lf} \sim 1/\lambda$, it has to be referred to a counter level for a full angular increment for weighing those values as a fraction of an angular increment $\Delta\phi_L$, for which purpose the computer uses the preceding counter level $z_{Lf}(t_{1,2})$.

The angular increments of the gyro and the encoder summed up between $t_1$ and $t_2$ which are integrated to a full angle in the computer over a rather long period of time, thus read:

$$\Delta\gamma_{12}^* = \Delta\phi_L^* \left[ z_{Lc} + \frac{z_{La}(t_2)}{z_{Lf}(t_2)} - \frac{z_{La}(t_1)}{z_{Lf}(t_1)} \right] \quad (7)$$

$$\Delta\alpha_{12}^* = \Delta\phi_T^* \left[ z_{Tc} + \frac{z_{Ta}(t_2)}{z_{Tf}(t_2)} - \frac{z_{Ta}(t_1)}{z_{Tf}(t_1)} \right]. \quad (8)$$

As far as the preceding counter level $z_{Lf}(t_2)$ for the weighting of $z_{La}(t_2)$ is concerned, an irregular rotation is accompanied by a minor loss in measurement accuracy which shall now be assessed.

As an example can be taken the experimental laser gyro system (ELSy) described in the journal DLR Nachrichten 61, November 1990, pages 12 to 15. The quantization angle $\Delta\phi_L$ is here 1.13″. For an incremental encoder a typical angular increment of $\Delta\phi_T=36″$ can be assumed, for instance. The preferred rate of rotation of gyro and encoder is $\dot{\alpha}=60°/s$. Thus a pulse frequency for gyro and encoder can be deduced:

$$f_L = \dot{\alpha}/\Delta\phi_L = 191.2 \text{ kHz}, \quad (9)$$

$$f_T = \dot{\alpha}/\Delta\phi_T = 6 \text{ kHz}. \quad (10)$$

A case oscillation of $\hat{\beta}=0.1°$ amplitude and at a frequency of $f=10$ Hz will first show in the measurement of the angle $\alpha$ by the optical encoder ($\alpha \approx \beta$). The maximum angular measurement error due to angular acceleration $\ddot{\alpha}$ is $$\delta\alpha = \frac{\ddot{\alpha}}{f_L f_T}$$

that means, with $|\ddot{\alpha}| = |\alpha \cos 2\pi ft|$ $$|\delta\alpha| \leq 4\pi^2 \hat{\alpha} \frac{f^2}{f_L f_T} \approx 0{,}005″, \quad (11)$$

which, in practice, is negligible, especially from the point of view that this error becomes zero in the mean for periodic angular accelerations.

Figure 4:
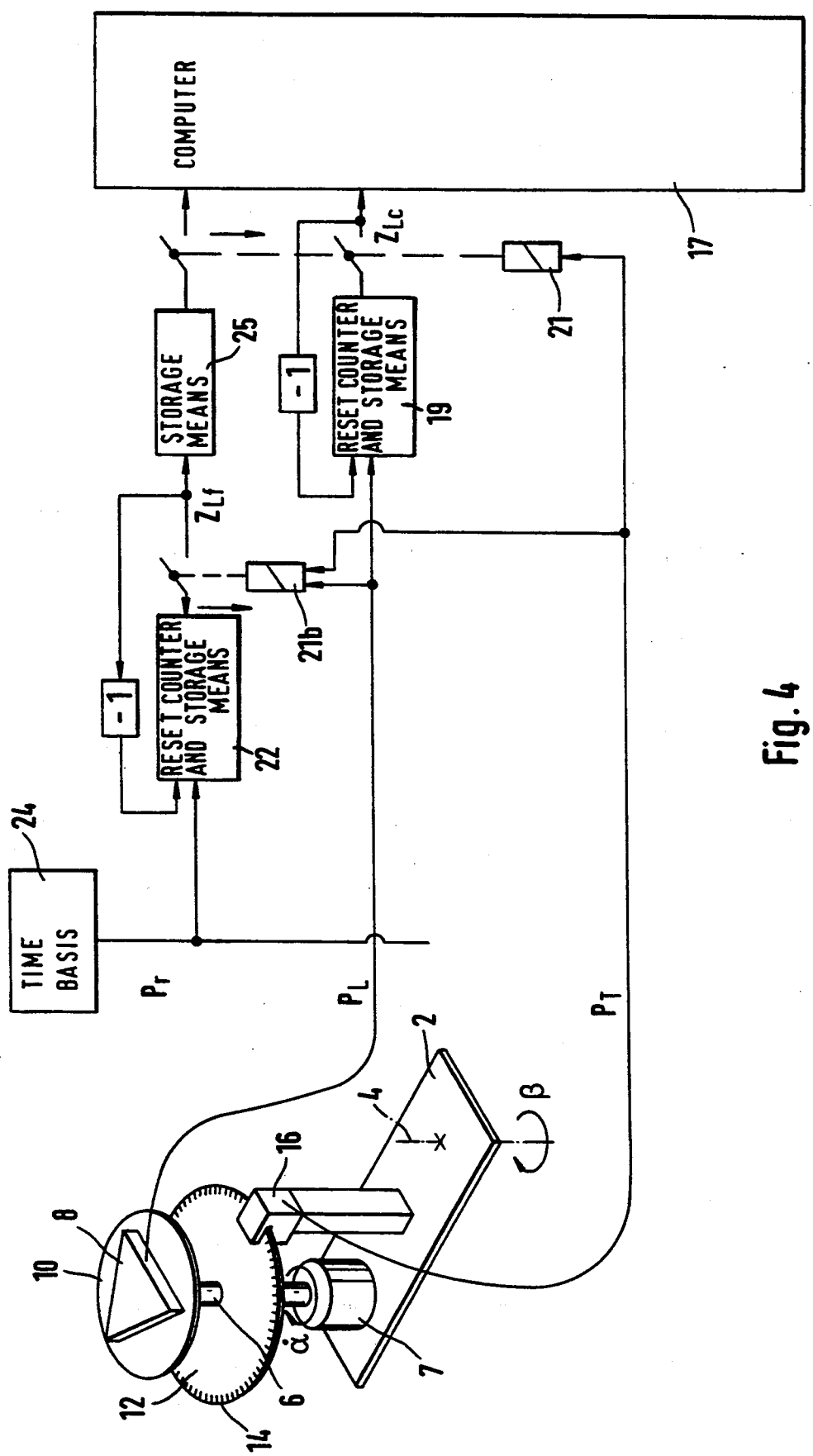
FIG. 4 shows the gyro system according to FIG. 1 together with a second embodiment of a circuitry for the readout of the gyro system.

FIG. 4 shows a simplified embodiment of the circuit 18 for signal processing with sampling control through the optical encoder. In contrast to the embodiment shown in FIG. 2 the data transfer from the memory $S_L$ and the counters $Z_{Lc}$ into the computer 17 is controlled by the impulses coming from the readout of encoder 14. In this case the interpolation of the encoder's angular increments $\Delta\phi_T$ becomes unnecessary, for which the price has to be paid that in the case of irregular movements the signal readout and processing becomes dependent on the variations of the angular velocity of the case. However, this example is advantageous for the calibration of the encoder sections described below. The signal procession for the gyro measurements is identical with that described above with reference to FIGS. 2 and 3, i.e. Equation (7) remains valid. In Equation (8), however, the two non-integer terms of the right side disappear.

In Equations (7) and (8) it was started from the assumption that the measurements contain errors.

In general, the gyro is assumed to have a relative scalefactor error $K_L$ and a drift D so that in accordance with Equation (7) the measured angle $\Delta\lambda^*$ differs from the actual angle $\Delta\lambda$ according to the following relationship:

$$\Delta\gamma^* = (1 + K_L)\Delta\gamma + \int_{t_1}^{t_2} D \, dt. \quad (12)$$

It is assumed here that the component of the angle due to earth rotation is compensated, as is the premise for spatial angular measurements. For measurements in a plane it is constant and can be understood as a contribution to the gyro drift.

For high precision angular measurements $K_L$ and D have to be defined, which can be done for the subject of the invention according to known procedures (angular measurements by the lasergyro GG 1342, DLR Forschungsbericht 89-50, 1989) in the geostationary state by reference to the full circle without additional hardware efforts.

For the encoder measurement according to Equation (8) a relative scalefactor deviation $K_T(\alpha)$ has to be assumed:

$$\Delta\alpha^* = [1 = K_T(\alpha)]\Delta\alpha, \quad (13)$$

where $K_T(\alpha)$ corresponds to the sum of the relative angular increment errors. It can equally be determined through initial calibration, through comparison with an angular standard or through direct comparison with the calibrated gyro in stationary state. For the storage of $K_T(\alpha)$ in the computer with a view to compensation in the measurement phase, the knowledge of the absolute angle $\alpha$ is necessary. This requires that the encoder 14 is equipped with a reference null mark.

Thus the angular measurements remain only influenced by the errors due to the instabilities of those parameters.

With the calibrated values for $K_L$, D and $K_T(\alpha)$ the Equations 7, 8 and 6 can continuously be evaluated as a basis for precision angular measurement and navigation on a moving base.

Although the combination of gyro and encoder can be realized with any type of gyro in accordance with the system presented here, this arrangement offers additional remarkable advantages for the lasergyro. Through the continuous rotation of gyro and encoder necessitated by this angular measurement system, the dead band typical for the lasergyro (lock-in effect) is automatically avoided. Through the continuous rotary movement the sensor noise which is a result of the conventional angular oscillation (dither), is mostly eliminated. Furthermore, the angular resolution which amounts to 2″, approximately, for the conventional lasergyro, can be considerably improved through this concept; according to the most recent developments in technology 0.01″ should be attainable.

For control application the maximum readout frequency or frequency bandwidth of the sensor system is also of interest. For those applications the described gyro measurement system also offers great advantages, as shown in the above example.

The angular measurement system presented here can fairly easily be extended to a system for the measurement of spatial angles.

Spatial angular measurements require the use of three gyros, i.e. for direct application of the above described concept three gyros, three encoders, three sets of slip rings for the energy and signal transfer and three drive systems.

Figure 5:
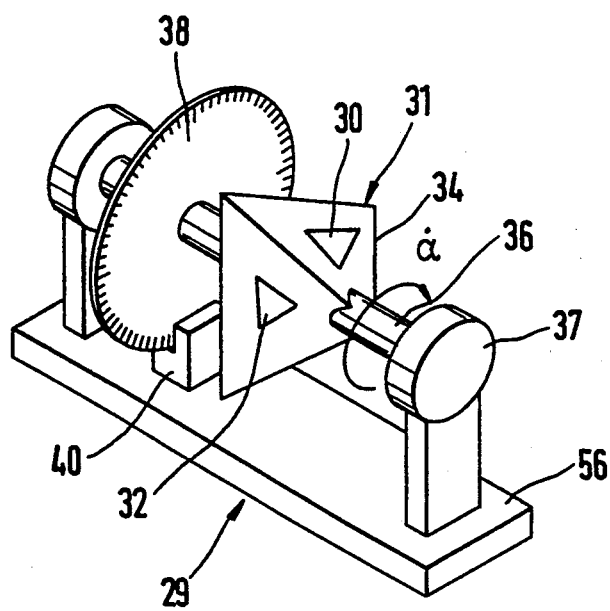
FIG. 5 shows an isometric representation of a modified embodiment of a gyro system implemented for spatial angular measurements.

FIG. 5 shows an embodiment advantageous for spatial angular measurements. The gyros 30, 32, 34 are each mounted on one of the three sides of a body having the form of a pyramid 31 with triangular basis. This gyro unit is symmetrically mounted on a shaft 36 rotated with an angular rate $\dot{\alpha}$ a motor 37. Thus all of the three gyros are subject to the same rate of rotation $\dot{\alpha}$. Such an arrangement is described in U.S. Pat. No. 4,017,187, and can be applied with particular advantage for lasergyros as the three gyros can be operated in rate bias mode at the angular rate $\dot{\alpha}$ and no "lock-in effect" occurs. In addition, a single encoder 38 is required which is concentrically mounted here on the shaft 36. The kind of signal readout and processing in connection with the measurement signal for the encoder disk is implemented as described above for the application with one gyro. In this case the measurement signals of all the three gyros, i.e. their three pulse trains $p_L$ for the angular increments are referred to the one pulse train $p_T$ for angular increments of the encoder readout system 40. The resulting pulse trains are a measure for the angular rate $\dot{\lambda}_k$ of the three gyros (index k) with respect to inertial space as well as after the summing up of the pulses a measure for the angular movement with regard to space executed by the system. The angular position $\alpha$ of the gyro unit (IMU, index g) measured by the encoder 38 with respect to the case-fixed coordinate system (index p) serves for the computation of the angular rate $\omega_p$ of the measurement unit with respect to inertial space $$\underline{\omega}_p = \underline{C}_{pg}(\alpha)\underline{\omega}_g. \tag{14}$$

The sensor for spatial angles has, of course, the same advantageous qualities as the arranged system described above for angles in a single plane. These concern, above all, the low noise, when ring lasers are used as angular sensors, the high angular resolution and the high bandwidth of the measurement.

Scalefactor errors and drifts lead to an increase with time of the angular error under the condition that a continuous rotation is foreseen here. This is true for lasergyros and also other gyroscopic sensors, to the least extent, however, for lasergyros. If the embodiment shown in FIG. 5 is applied, deterministic error contributions can be calibrated in the same way as in the gyro system described above for angular measurements in the plane.

Figure 6:
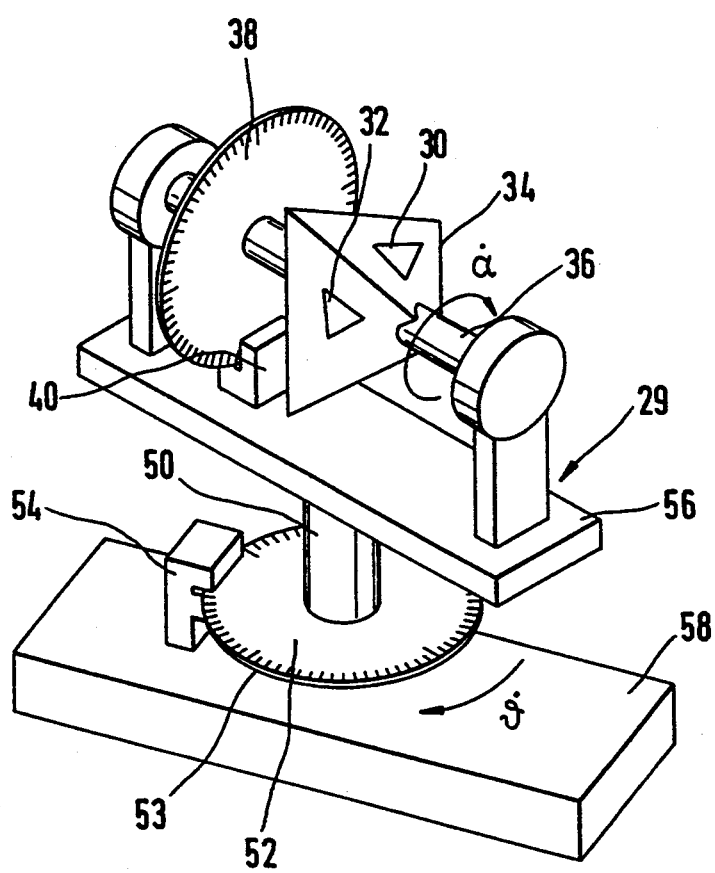
FIG. 6 shows a further embodiment of the gyro system according to FIG. 5.

For angular measurements on a moving base or for navigation over a rather long period of time deviations of the scalefactor and drift of the calibrated values lead to measurement errors. FIG. 6 shows an arrangement which reduces in the known way (U.S. Pat. No. 4,017,187) also those errors to a minimum. For that purpose the turnable sensor block 29 shown in FIG. 5 is mounted on a second turnable shaft 50 which is mounted perpendicular to the axis of the first shaft 36 and turnable to a basis 58. The shaft 50 in driven by a motor (not shown). Also on this shaft 50 a disk 52 with an encoder 53 is concentrically mounted which cooperates with a readout system 54. The angle $\dot{v}$ measured between the plate 56 carrying the sensor block 29 (index p) and the basis 58 (index b) serves for the computation of the angular rate of this measurement unit in the base-fixed coordinate system:

$$\underline{\omega}_b = \underline{C}_{bp}(v)\underline{\omega}_p = \underline{C}_{bp}(v)\underline{C}_{pg}(\alpha)\underline{\omega}_g. \tag{15}$$

In a system with ring laser gyros the angular rate $\dot{\alpha}$ about the axis of the first shaft 36 has to be set sufficiently high so that the three gyros will operate above the dead band (lock-in range); the angular rate $\dot{v}$ of the second shaft 50 which serves for the averaging of the angular measurement errors due to scalefactor errors and drifting of the three gyros (carouseling), can be set much lower. The analysis shows that quasiconstant sensor errors, i.e. errors which change much slower with respect to the rotation period about the second axis, are averaged out—with the exception of a small remainder proportionate to the sum of the respective product of the scalefactor error of the three gyros with the angular rate $\dot{v}$ about the axis of the second shaft 50. This can also be eliminated when the sign of $\dot{v}$ is reversed after one or two periods.

The essential advantages of the described new gyro system for precision angular measurement can be summed up as follows:

self calibration at passage of the 360° mark;
high calibration accuracy by averaging over a great number of measurement data;
high bandwidth;
increase of angular resolution of lasergyro systems ($\approx 0.01''$)
possibilities of extension to a system for spatial angular measurements with, to a large extent, compensation of scalefactor and drift errors.

We claim:

1. System for measuring angles comprising:
    a gyro mounted on a shaft turnably mounted on a case and driven at a constant angular rate with respect to said case and being provided with a first readout system issuing readout signals from said gyro in the form of a first pulse train ($P_L$);
    an encoder for measuring the angular position ($\alpha$) of said gyro with respect to said case including an encoder disk mounted concentrically on said shaft and cooperating with a second readout system fixed to said case, said encoder disk issuing readout signals in the form of a second pulse train ($P_T$); and
    a circuit comprising
        computing means,
        first means for counting the pulses of the first pulse train,
        a time basis providing time pulses at a constant frequency higher than the maximum pulse frequency of the pulses in said first pulse train, second means for counting the pulses provided by said time basis, switching means for reading in the levels of said first and second counting means in said computing means, and means for controlling said switching means, the computing means being programmed for computing the angular position from the levels of said first and second counting means.

2. System according to claim 1, said switching means being controlled by pulses of said second pulse train ($P_T$).

3. System according to claim 1, said switching means being controlled by said computing means at random points of time.

4. System according to claim 1, said first counting means comprising, for the pulses of the first pulse train, a first reset counter, the level of which being used for computing the coarse resolution of the inertial angle of rotation of said case, said second counting means comprising, for the pulses of said time basis, a second reset counter, the level of which being used for computing the fine resolution of the inertial angle of rotation of said case, said switching means comprising first and second switching means for reading in the output of said first and second reset counters in said computing means, said controlling means comprising means for simultaneously actuating said first and second switching means, and said system further comprising first and second storing means for the levels of said first and second reset counters, said first and second storing means storing the preceeding counter level read in said computing means for the period of one pulse, the levels of said first and second storing means being read in together with the actual levels of said first and second reset counters in the computing means for computing the inertial angle of rotation of the case.

5. System according to claim 4, the first and second switching means being controlled by pulses of said second pulse train ($P_T$).

6. System according to claim 4 further comprising third storing means for the level of said second reset counter, said third storing means being connectable by third switching means to said second reset counter, said third switching means being controlled by the pulses of the first pulse train and said third storing means being connected to said second switching means for reading in the level of said third storing means in the computing means.

7. System according to claim 4 further comprising:

for the pulses of the second pulse train, third counting means including a third reset counter, the level of which being use for computing the coarse resolution of the inertial angle of rotation of said case;

fourth switching means for reading the output of said third reset counter in said computing means;

fourth storing means for the levels of the said third reset counters storing the preceeding counter level read in said computing means for the period of one pulse, the level of said fourth storing means being read in together with the actual levels of said third reset counter in the computing means for computing the inertial angle of rotation of the case.

8. System according to claim 7 further comprising:

for the pulses of said time basis, a fourth counting means including a fourth reset counter;

fifth switching means for reading in the output of said fourth reset counter in said computing means;

means for simultaneously actuating said first, second, third, fourth and fifth switching means;

fifth storing means for the levels of said fourth reset counter storing the preceeding counter level read in said computing means for the period of one pulse, the level of said fourth storing means being read in together with the actual levels of said fourth reset counter in the computing means for the computing the inertial angle of rotation of the case.

9. System according to claim 8 further comprising sixth storing means connectable by sixth switching means to said fourth reset counter, said sixth switching means being controlled by the pulses of the second pulse train and said sixth storing means being connected to said fifth switching means for reading in the level of said sixth storing means in the computing means.

10. System according to claim 9, said first through sixth switching means being controlled by said computing means at random points of time.

11. System according to claim 1, for spatial angular measurements, further comprising at least three gyros mounted on said shaft with the measurement axes of said gyros in three different spatial directions each of said gyros being each provided with a readout system.

12. System according to claim 11, for averaging of the gyro errors, the shaft carrying said at least three gyros and said encoder being arranged on a platform on which the readout system of said encoder is fixed and which is mounted on a second shaft whose axis lies perpendicular to the axis of said shaft on which said at least three gyros are mounted, said second shaft being driven at a constant rotational rate relative to said case, and on said second shaft a second encoder disk is mounted which cooperates with a readout element fixed in said case.

13. System according to claim 10 wherein for the complete averaging of gyro scale factor variations means are provided for changing the sense of rotation of the platform about the axis of the second shaft after at least one period of rotation.

* * * * *